(12) United States Patent
Verma et al.

(10) Patent No.: US 10,613,794 B1
(45) Date of Patent: Apr. 7, 2020

(54) DETERMINING COMPUTING RESOURCE UTILIZATION IN DISTRIBUTED SYSTEMS

(71) Applicant: Amazon Technologies, Inc., Seattle, WA (US)

(72) Inventors: Varun Verma, Newcastle, WA (US); Daniel Rabinovich, Seattle, WA (US); Ankur Choudhary, Seattle, WA (US); Alok Nath Katiyar, Lake Forest Park, WA (US)

(73) Assignee: Amazon Technologies, Inc., Seattle, WA (US)

( * ) Notice: Subject to any disclaimer, the term of this patent is extended or adjusted under 35 U.S.C. 154(b) by 321 days.

(21) Appl. No.: 15/809,903

(22) Filed: Nov. 10, 2017

(51) Int. Cl.
*G06F 3/06* (2006.01)

(52) U.S. Cl.
CPC .......... *G06F 3/0653* (2013.01); *G06F 3/0604* (2013.01); *G06F 3/067* (2013.01); *G06F 3/0608* (2013.01)

(58) Field of Classification Search
CPC ...... G06F 3/0653; G06F 3/0604; G06F 3/067; G06F 3/0608
See application file for complete search history.

(56) References Cited

U.S. PATENT DOCUMENTS

| 9,244,958 B1 * | 1/2016 | MacCanti | G06F 16/273 |
| 9,628,561 B1 * | 4/2017 | Kulkarni | G06F 11/1464 |
| 2006/0265713 A1 * | 11/2006 | Depro | G06F 11/3409 718/104 |

* cited by examiner

*Primary Examiner* — Francisco A Grullon
(74) *Attorney, Agent, or Firm* — Davis Wright Tremaine LLP

(57) ABSTRACT

A metrics subsystem determines the utilization of computing resources of server computer systems. The metrics subsystem may obtain metadata associated with a plurality of computing resources used to provide a service. The metrics subsystem determines a set of references to data included in the metadata and aggregates references of the set of references to determine utilization of computing resources and provides the utilization to a metering service.

20 Claims, 8 Drawing Sheets

DETERMINING COMPUTING RESOURCE UTILIZATION IN DISTRIBUTED SYSTEMS

BACKGROUND

Customers of a computing resource service provider may reduce expenses and overhead by using remote program execution and remote data storage services provided by the computing resource service provider. Customer applications may be distributed over multiple virtual machine instances and computing systems such as server computer systems. In addition, these computing systems may include various block-level storage devices and other computing devices that may be used to provide computing resources to customers. In distributed computing environments, however, scalability, availability, durability, and performance are complex problems to solve, especially as the number of computing devices involved increases. Moreover, many distributed computer systems utilize mechanisms to increase efficiency and utilization of these computing resources. These mechanisms may add to the complexity and structure of these distributed computing environments providing computing resources to customers. Further adding to the complexity are differences in devices, such as different disk drives and, generally, differences that introduce additional factors to be taken into account when managing such distributed computing systems. As a result, maintaining scalability, availability, durability, and performance in distributed computing environments with heterogeneous computing resources that utilize mechanisms to increase efficiency and utilization of the computing resources is difficult and complex. In addition, this difficulty and complexity increases with the size of these distributed computing resource environments.

BRIEF DESCRIPTION OF THE DRAWINGS

Various techniques will be described with reference to the drawings, in which.

DETAILED DESCRIPTION

Figure 1:
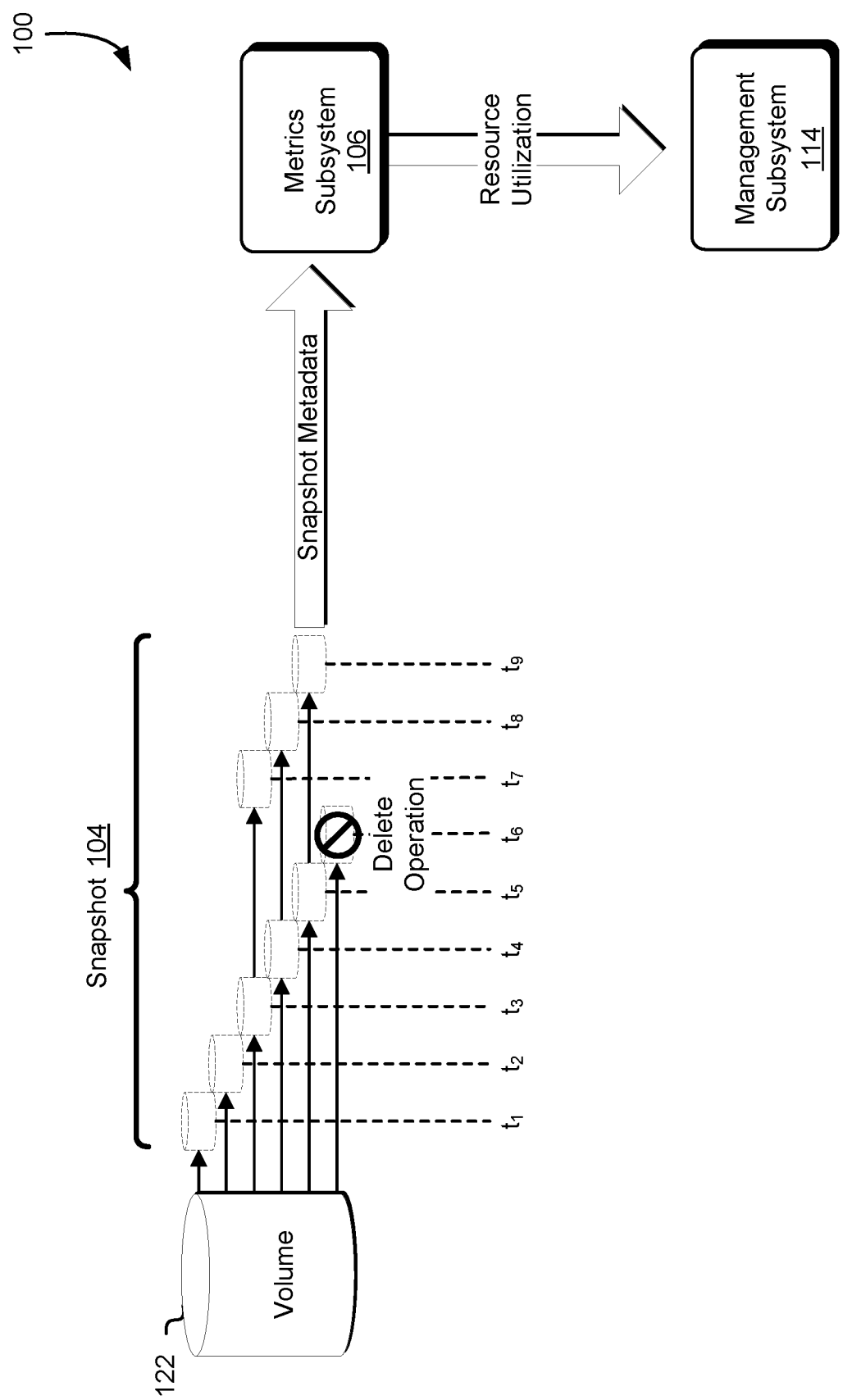
FIG. 1 illustrates an environment in which a metrics subsystem determines computing resource utilization associated with a logical storage volume in accordance with an embodiment.

Techniques and systems described below relate to attributing utilization of computing resources of server computer systems in a fleet of server computer systems provided to customers of a computing resource service provider to an appropriate customer created resource. In various examples, a data storage service of the computing resource server provider provides customers with the ability to create logical storage volumes and generate snapshots or otherwise back up data of these logical storage volumes as described in greater detail below. In addition, in these examples, the data storage service may generate incremental backups that reference data associated with other logical storage volumes as opposed to generating an entire copy of the logical storage volume. For example, a customer may operate a virtual machine instance with an attached first logical storage volume and cause a second logical storage volume to be created based at least in part on a snapshot of the first logical storage volume. The second logical storage volume may reference data associated with the first logical storage volume for at least a portion of the data shared between the first logical storage volume and the second logical storage volume. In such scenarios it may be difficult for customers to determine the attribution and/or utilization of computing resources between the first logical storage volume and the second logical storage volume.

Furthermore, in various examples described below, when computing resources reference other computing resources to reduce utilization, it may be difficult to attribute utilization of the underlying physical computing resources. Returning to the example above, when two or more snapshots of a logical storage volume share data (e.g., one snapshot references data stored in the second snapshot) it can be difficult to attribute the utilization of computing resources to store the data between the two or more snapshots. A metrics subsystem, in various examples, is used to determine attribution of computing resources to the underlying physical computing resources. The metrics subsystem may determine the usage of individual components of the computing resources as well as at point in that these individual components were created. In an example, the metrics subsystem determines the physical storage device utilization for chunks of data (e.g., blocks of data written to disk) based at least in part on metrics information obtained from server computer systems. The metrics information may include a manifest of a logical storage volume and/or manifest of a snapshot of the logical storage volume. In various examples, the manifest indicates locations where data objects may be found, such that the manifest can act as a map to the data contained in the logical storage volume, including references to other logical storage volumes.

The metrics subsystem may determine utilization of a set of computing resources based at least in part on the metadata and attribute the utilization to the earliest computing resources of the set of computing resources. In one example, the metrics subsystem parses the manifests included in the metadata obtained from data storage serves of the data storage service to determine data references to other logical storage volumes and data unique to particular logical storage volumes. The metrics subsystem may then attribute computing resource utilization to the earliest instance of the computing resource to which other computing resources reference. For example, if a first logical storage volume contains 10 Gigabytes (Gb) of data and a second logical storage volume contains 15 Gb of data, 10 Gb of which reference the first logical storage volume, the metrics subsystem may attribute the utilization of computing resources used to store the 10 Gb of data of the second storage volume which reference the first storage volume to the first storage volume. Furthermore, the information generated by the metrics subsystem may be present to the customer using different visualizations, as described in greater detail below. This information may enable customers to determine and understand their resource utilization. In addition, customers may use this information to reduce their utilization of computing resources.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 is a representation of a system 100 of the present disclosure. As illustrated in FIG. 1, the representation depicts a technique for determining computing resources utilization for a plurality of snapshots of a logical storage volume 122 by at least analyzing snapshot metadata. In some examples described in the present disclosure, a "snapshot" may refer to a copy of a portion of a logical storage volume at a particular point in time. A snapshot of the present disclosure may include incremental data (e.g., a change set indicating modifications to existing blocks of data and/or additional blocks of data of the logical storage volume) that includes data that is new or has changed since a previous snapshot (e.g., a full snapshot or snapshot) was captured. In various embodiments, a data storage service (not shown in FIG. 1 for simplicity) causes the incremental data to be pushed from the logical storage volume 122 operated by a customer owner of the logical storage volume (e.g., via an application programming interface call) to the system storing the snapshots.

In other implementations, the system performing the snapshot copies the incremental data directly from the logical storage volume without a contemporaneous command from a customer. The snapshot may further include a portion of the logical storage volume 122 (which may be referred to as a "mandatory set") which may include a copy of a certain portion or proportion of the entire logical storage volume 122. In some embodiments, the proportional portion may be pushed, as with the incremental portion, by the customer to the system performing the snapshot updating in response to a command from the customer. Additionally or alternatively, in some implementations, the system performing the snapshot obtains a portion of the data of the logical storage volume 122 from previous snapshots. In some embodiments, the data obtained from previous snapshots includes references to the location of the data stored on a physical storage device (e.g., hard disk drive). As described in greater detail below, the incremental data may include a set of references to previous snapshots; the previous snapshots may in turn reference other snapshots.

Each of the snapshots of the set of set of snapshots 104 can be seen to have been captured at a different point in time and/or in response to a distinct command from the customer associated with the logical storage volume 122. For example, the first snapshot of the set of snapshots 104 can be seen as being captured at time $t_1$, the second snapshot of the set of snapshots 104 can be seen as being captured at time $t_2$, and so on up to the most recent captured snapshot of the set of snapshots 104 captured at time $t_9$. In some examples, the term "snapshot depth" (which may also be referred to simply as "depth") may refer to how many snapshots of the set of snapshots 104 are associated with the logical storage volume 122. As described in greater detail below, the data storage service may maintain snapshot metadata associated with each snapshot indicating an owner and/or customer associated with the snapshot, a timestamp indicating when the snapshot was created, a manifest associated with the snapshot, and/or any other information suitable for determining an amount of computing resources utilized by one or more snapshots of the logical storage volume 122.

The logical storage volume 122 may be a logical storage space within a data storage system of the data storage service in which data objects and/or blocks of data may be stored. The logical storage volume 122 may be identified by a volume identifier, customer identifier, or other identifier suitable for distinguishing between a plurality of logical storage volumes. Data for the logical storage volume 122 may reside in one physical storage device (e.g., a hard disk drive) or may comprise multiple partitions distributed across multiple storage devices. As an example, the logical storage volume 122 may be a volume of block-level storage residing on one or more block-level storage devices of the data storage service provided by a computing resource service provider. The block-level storage devices may, for instance, be operationally attached to virtual computer systems provided by a virtual computer system service of the computing resource service provider to serve as logical storage units (e.g., virtual drives) for the computer systems. A block-level storage device may enable the persistent storage of data used/generated by a corresponding virtual computer system, whereas the virtual computer system service may only provide ephemeral data storage. The set of snapshots 104 may be one or more snapshots of the logical storage volume 122 including the data maintained in the logical storage volume 122 (e.g., the current state of the virtual computer system).

As shown, the embodiment 100 has a snapshot depth of nine, and thus the logical storage volume 122 is associated with nine distinct snapshots which may include incremental data referencing one or more previous snapshots as well as unique data (e.g., data stored in a physical storage location associated with a particular snapshot that does not reference another snapshot). For example, the snapshot at time $t_2$, may include a set of references to all of the data maintained in the snapshot at time $t_1$ of the logical storage volume 122. In addition, the snapshot at time $t_2$ may include unique data or data that is not referenced to the snapshot at time $t_1$ of the logical storage volume 122. Likewise, the snapshot at time $t_3$, may include a set of the snapshot at time $t_2$ of the logical storage volume 122. Note that in this manner references of a particular snapshot may reference other references of another snapshot.

Furthermore, as shown in FIG. 1, the snapshot at time $t_6$, is deleted. As described in greater detail below, the delete operation may be initiated by a customer associated with the logical storage volume 122 or by the data storage service. Furthermore, as a result of the delete operation the snapshot at time $t_7$ may obtain any references from the snapshot at time $t_6$ that is not already included in the set of references of the snapshot at time $t_7$. Note that at this point in time, the combination of each of the snapshots $t_1$ through $t_9$ contains all of the data associated with the logical storage volume 122. Note as well, that each of the snapshots of time $t_1$ through $t_9$ may represent a distinct logical storage volume that may be used to support and/or instantiate virtual computer systems as described above.

Note also that the snapshot captured at time $t_7$ once again contains a set of references that reference data and/or references from the snapshots captured at times $t_{1-6}$ from the logical storage volume 122. For example, the snapshot captured at time $t_7$ may include any references to data obtained from to the first, second, third, fourth, fifth, and sixth snapshots of the logical storage volume. In some implementations, the snapshot captured at time $t_6$ can be deleted to conserve space and/or reduce the utilization of computing resources associated with the logical storage volume 122. Note that, in some of these implementations, a set of snapshots 104 is analyzed to determine data unique to each snapshot. The unique data may be retained until a customer of the logical storage volume 122 orders their deletion, whereas in other implementations, the unique data is deleted automatically. In still other implementations, a certain amount of most recent unique data may be retained, or unique data of each snapshot may be retained for a certain period of time (e.g., five days) before being deleted, or may be retained until the cumulative size of unique data in the set of snapshots 104 exceeds a certain threshold upon which time select snapshots may be deleted (e.g., oldest first) to keep the space requirements for the snapshots below the threshold. Alternatively to deleting the unique data during the events described above, as opposed to deleting the unique data and/or snapshot, the unique data may be moved and/or transferred to longer term storage.

Note that there are various implementations that may be used to generate information indicating the consumption and/or utilization of computing resources to maintain data associated with the logical storage volume 122 and the set of snapshots 104. In the manner described in the present disclosure, the snapshot metadata including a manifest may be used to aggregate the references of the set of snapshots to determine the particular snapshot of the set of snapshots 104 in which a particular block of data originated (e.g., the earliest point in time of $t_{1-9}$) and attribute the utilization of computing resources to the particular snapshot. As described in the present disclosure, the manifest includes a reference to every data object of the logical storage volume 122 and to the location where the most recent version of the data object can be found in the active set of snapshots 104.

In one example, the manifest for a particular snapshot of the set of snapshots 104 is a listing of a set of data objects stored within the logical storage volume 122. The listing may be entries in a file, database, memory, or other medium, and/or data structure. The listing may include location information that indicates where the data objects of the set of data objects may be found within the logical storage volume 122, within a particular snapshot, or at some other location. Thus, the location information may include information that uniquely distinguishes each snapshot, volume, database entry, or other storage location (e.g., such as a unique identifier, name, storage device and logical block address, database table, record identifier, etc.). With this information the metrics subsystem 106, as described in greater detail below in connection with FIG. 2, may aggregate references and determine a storage location for all of the data of a particular snapshot. The resource utilization information may be provided to a management subsystem 114, described in greater detail below in connection with FIG. 2, the resource utilization information may be provided to the customer and/or used to perform various operations described in the present disclosure (e.g., determining snapshots to delete and/or move to long term storage).

In some implementations each of the set of snapshots 104 has an associated set of permissions that grant access (e.g., read access, write access, etc.) to that particular snapshot, such that a user or other entity having a first set of permissions granting access to first snapshot is unable to access a second snapshot unless the user or other entity also has a second set of permissions granting access to the second snapshot. In some embodiments, one or more of the set of snapshots 104 share a set of permissions that grant access to the one or more of the set of snapshots 104. In this manner, network security may be improved because users and other entities can be assigned permissions only to the actual snapshot they need to access.

Figure 2:
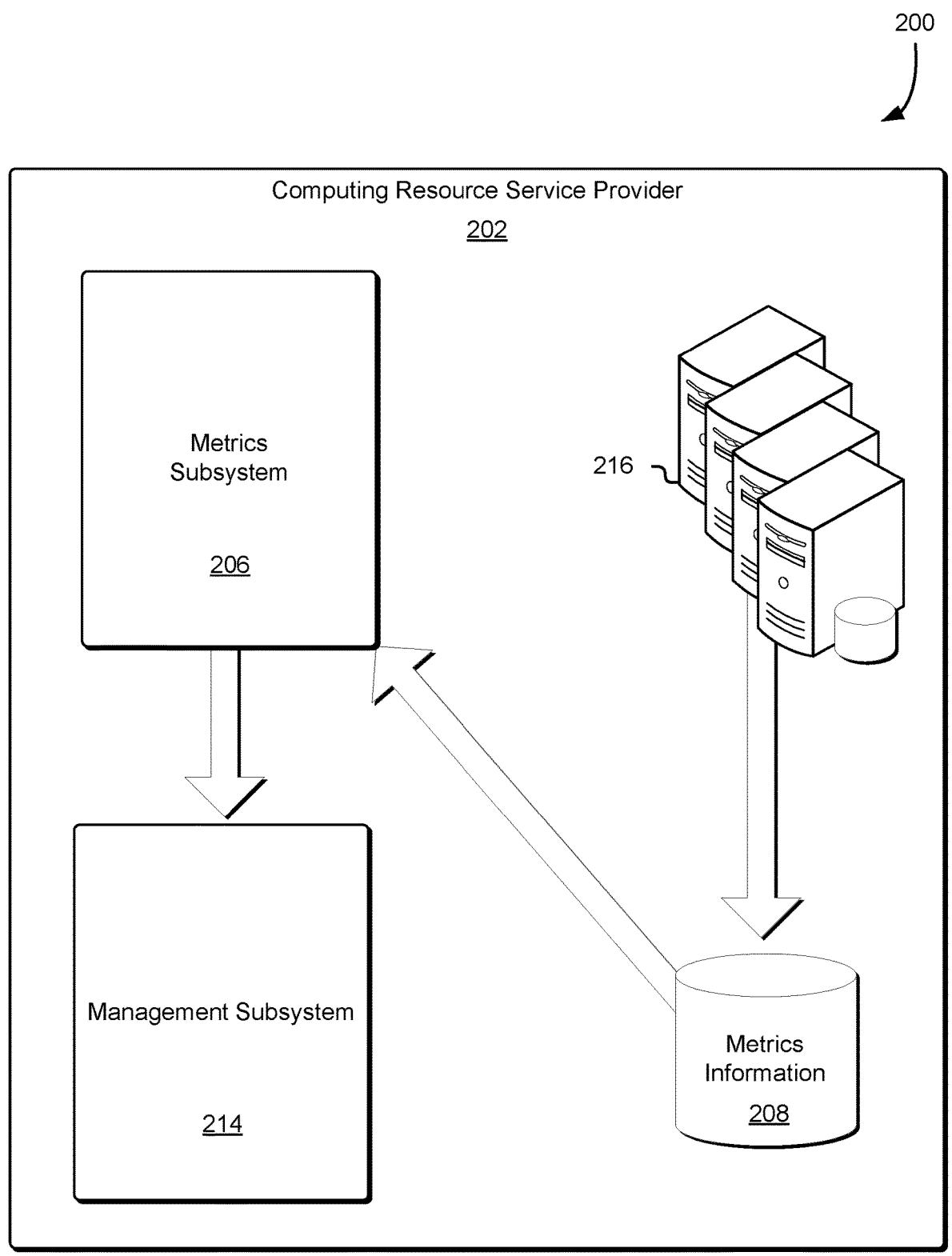
FIG. 2 illustrates an example of a service provided by a computing resource service provider in accordance with an embodiment.

FIG. 2 shows an illustrative example of an system 200 which includes a service that is provided by a computing resource service provider 202 in accordance with an embodiment. The service of a computing resource service provider 202 may be used to operate a block-level data storage service, a compute service, a networking service, an on-demand data storage service, or other service of a computing resource service provider 202 that utilizes computing resources to implement, service and provide functionality to a customer such as described above in connection with FIG. 1. As illustrated in FIG. 2, the service includes various subsystems such as a metrics subsystem 206 and a management subsystem 214. The service may also include a plurality of server computer systems 216, which may store information and/or metadata associated with the server computer systems 216 such as snapshot creation time stamp, customer identification information, manifest information, or any other information or metadata associated with logical storage volumes maintained by the server computer systems 216. In various embodiments, the server computer systems 216 include data storage servers as described in greater detail below in connection with FIG. 4. In yet other embodiments, the server computer systems 216 are virtualized or include one or more virtualized components. Furthermore, the metrics subsystem 206 and/or the management subsystem 214 may be implemented by physical computing resources, virtual computing resources, or a combination thereof.

In an embodiment, the service of the computing resource service provider 202 includes a request processing subsystem (not shown in FIG. 2 for simplicity) which is a collection of computing resources, such as webservers and application servers, that process requests submitted to the computing resource service provider 202. The request processing subsystem, for example, may include one or more webservers that provide a web service interface to enable customers of the service of the computing resource service provider 202 to submit requests to be processed by the service of the computing resource service provider 202, such as a request to delete or otherwise make available computing resources associated with the service. In various embodiments, the metrics subsystem 206 includes executable code or other logic that, when executed by a computer system such as the server computer systems 216, causes the computer systems to perform various operations described in the present disclosure such as obtaining metadata from the metrics information data store 208 and determining utilization of computing resources of the service by one or more customers of the service.

Components of the metrics subsystem 206 may interact with other components of the service or the computing resource service provider 202 (e.g., through network communications). For example, in determining the utilization of storage resources of a set of snapshots associated with the customer, the metrics subsystem 206 may communicate with the server computer systems 216, the metrics information data store 208, the customer through a management console (described in greater detail below in connection with FIGS. 5 and 6), or other component of the computing resource service provider 202. In another example, the metrics subsystem 206 obtains the snapshot metadata and manifest from the metrics information data store 208 and determines utilization based at least in part on the information obtained from the metrics information data store 208. Communication between the various subsystems (e.g., the metrics subsystem 206 and the management subsystem 214), in various embodiments, is accomplished by the transmission of requests between the computing resources implementing the various subsystems. Furthermore, in some embodiments, the request processing subsystem may be responsible for receiving requests and directing the requests to the appropriate subsystem.

In one example, these requests may be processed by the management subsystem 214 upon receipt by the request processing subsystem. If applicable, various requests processed by the request processing subsystem and/or management subsystem 214 may result in the management subsystem 214 generating visualizations and other information to provide to the customer indicating the utilization of computing resources of the service. In one example, the metrics subsystem 206 provides the management subsystem 214 with utilization information indicating particular snapshots that contain unique data; the management subsystem 214 then deletes the particular snapshots to make additional computing resources available. In yet other embodiments, the management subsystem 214 simply makes this information available to the customer (e.g., through a management console). Additionally, the management subsystem 214 and metrics subsystem 206 may utilize information included in the metrics information data store 208 to perform various operations described in the present disclosure.

In addition, some requests processed by the request processing subsystem that involve operations on data objects (e.g., upload, download, snapshot, delete) may include interactions between the request processing subsystem and one or more server computer systems 216. In various embodiments, the server computer systems 216 are computer systems communicatively coupled with one or more storage devices for the persistence of data objects. In one example, in order to process a request to delete a snapshot, the request processing subsystem may transmit data to server computer systems 216 to cause the server computer systems 216 to delete blocks of data associated with the snapshot. It is noted, however, that in some embodiments, client computer systems (e.g., customers) may transmit data directly to the server computer systems 216 instead of through servers of the request processing subsystem.

In some embodiments, data is maintained by multiple server computer systems 216 for the purposes of redundantly storing the data to allow the retrievability of data in the event of failure of an individual server computer system 216 and/or associated data storage device. For example, in some embodiments, logical storage volumes may include a plurality of storage partitions to provide data redundancy. In such embodiments, snapshots created from the logical storage volume only include a single copy of the logical storage volume. Furthermore, as described above, references to data stored in other snapshots may be included in the snapshot to reduce an amount of computing resources required to store the snapshot.

As described in greater detail below, information maintained in the metrics information data store 208 may be used to manage and track data associated with logical storage volumes maintained by the server computer systems 216. In one example, the information is used to track successful execution of snapshots of logical storage volumes, an amount of time taken to generate the snapshots, a time the snapshot was created, and a customer associated with the snapshot. In one example, the metadata includes a manifest including a set of references as described above. In various embodiments, the metrics subsystem 206 aggregates all of the information (e.g., metadata and/or manifest) for all of the logical storage volumes maintained by the server computer systems prior to determining the utilization of computing resources for each logical storage volume. In yet other embodiments, the metrics subsystem 206, in response to a trigger (e.g., customer request, expiration of an interval of time, failed creation of a snapshot, encryption of a snapshot, copying of a snapshot, or other triggering event) obtains the metadata or other information from the metrics information data store 208 for a particular set of logical storage volumes maintained by the server computer systems 216 (e.g., logical volume of a particular customer, logical volumes created after a particular point in time, etc.).

Figure 3:
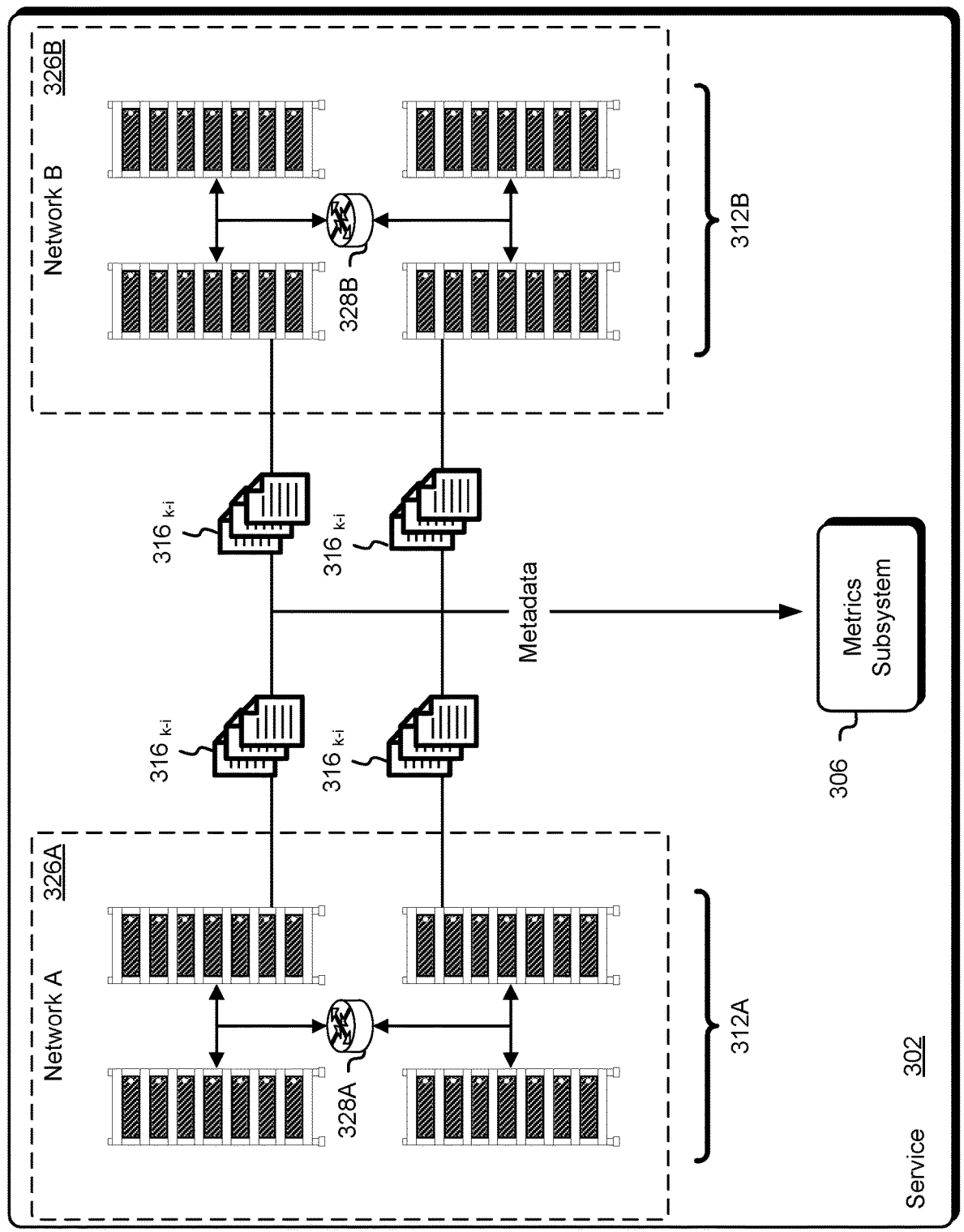
FIG. 3 illustrates an environment in which a metrics subsystem determines computing resource utilization associated with a logical storage volume in accordance with an embodiment.

FIG. 3 illustrates an aspect of an system 300 in which an embodiment may be practiced. Specifically, FIG. 3 depicts a metrics subsystem 306 obtaining metadata 316 from computing resources within the servers in sets of racks 312A-312B to be used to determine the utilization of the computing resources within the servers in sets of racks 312A-312B by one or more customers. The system 300 includes the metrics subsystem 306 of a service 302, as described above, that provides utilization information indicating the utilization of computing resources of the server computer systems or other components of the sets of racks 312A-312B. The metadata $316_{k\text{-}i}$ obtained from different server computer systems in the sets of racks 312A-312B may include metadata and/or manifests as described above. In one example, the manifest includes information that enables the metrics subsystem 306 to determine resource utilization (e.g., storage of data to physical storage medium) by at least aggregating references to storage locations and assigning the utilization to the customer operated computing resources that was created first. Other mechanisms for assigning the utilization other than first in time are considered within the scope of the present disclosure.

As described above, the manifest may include references to other snapshots, which may in turn reference other snapshots until the reference points to a snapshot containing the data. In one example, the metrics subsystems 306 parses the manifest information for all logical storage volumes supported by the server computer systems and aggregates all references to the same block of data for a particular customer and associates the utilization of the computing resources to maintain the block of data to a single customer operated computing resource. In various embodiments, the logical storage volume includes any data maintained by a server computer system. As described above, the customer may cause a snapshot of the logical storage volume to be created. Furthermore, the service 302 may perform data de-duplication or other operations to reduce an amount of computing resources required to create and/or maintain that snapshot during creation the snapshot. Data de-duplication, in one example, includes determining data of the logical storage volume to be stored in the snapshot that may be referenced to at least one other snapshot. In this manner the snapshot may include references to other snapshots which may contain the data, as opposed to writing the data to physical computing resources associated with the snapshot.

The metrics subsystem 306 may be software or executable code executed by the servers in the sets of racks 312A-312B or other computing resources to that obtains metadata $316_{k\text{-}i}$ from the server computer systems in the sets of racks 312A-312B and determines the utilization of computing resources of the server computer systems in the sets of racks 312A-312B as described above in conjunction with FIG. 1. The sets of racks 312A-312B may be physical hardware that hosts one or more server computer systems or, in some embodiments, is simply a logical grouping of the one or more server computer systems. Examples of logical groupings, other than by rack, may include servers grouped together based on data center location, servers in different fault isolation groups (i.e., logical divisions of resources such that failure of one fault zone may not affect servers in the other zones; e.g., grouped by geographic regions, data centers, hard drive clusters, backup generators, etc.), servers grouped together based on performance characteristics (e.g., throughput, input/output operations per second, etc.), and so on. The server computer systems in a rack may be members of a particular network. In some implementations, multiple racks of servers may be members of the same network. For example, as illustrated in FIG. 3, the server computer systems of the set of racks 312A share the network 326A. Likewise, the servers of the set of racks 312B share the network 326B.

The networks 326A-326B may be data communication pathways between one or more electronic devices. The networks 326A-326B may be wired or wireless networks and may use any of a variety of communications protocols for organizing their network traffic. The networks 326A-326B may allow the sharing of files, data, and other types of information between the one or more electronic devices accessible through the data communication pathways. Each of the networks 326A-326B may be associated with a router, such as an aggregation router that aggregates the servers of the respective set of racks into the common network, separate from the router associated with the other network. Each of the networks 326A-326B may be on a different subnet than the other network. For example, as illustrated in FIG. 3, the servers of the set of racks 312A may be commonly connected to a router 328A. Similarly, the servers of the set of racks 312B may be commonly connected to a router 328B. The routers 328A-328B may be networking devices that forward packets between computer networks, such as between the networks 326A-326B.

As described above, the metrics subsystem 306 may determine utilization information, on a per customer and/or per computing resources provided to customer basis, of the underlying physical computing resources of the server computer systems in the sets of racks 312A-312B utilized to implement various computing resources. The metrics subsystem 306 may obtain the metadata $316_{k\text{-}i}$ from server computer systems in the sets of racks 312A-312B as described above. Furthermore, the metrics subsystem 306 may also include a data warehouse or data storage system that stores the metadata $316_{k\text{-}i}$ such that the metadata $316_{k\text{-}i}$ may be queried and/or organized for use in determining utilization. The service 302 or component thereof such as the management subsystems, as described above, may cause one or more server computer systems to transfer the metadata.

Figure 4:
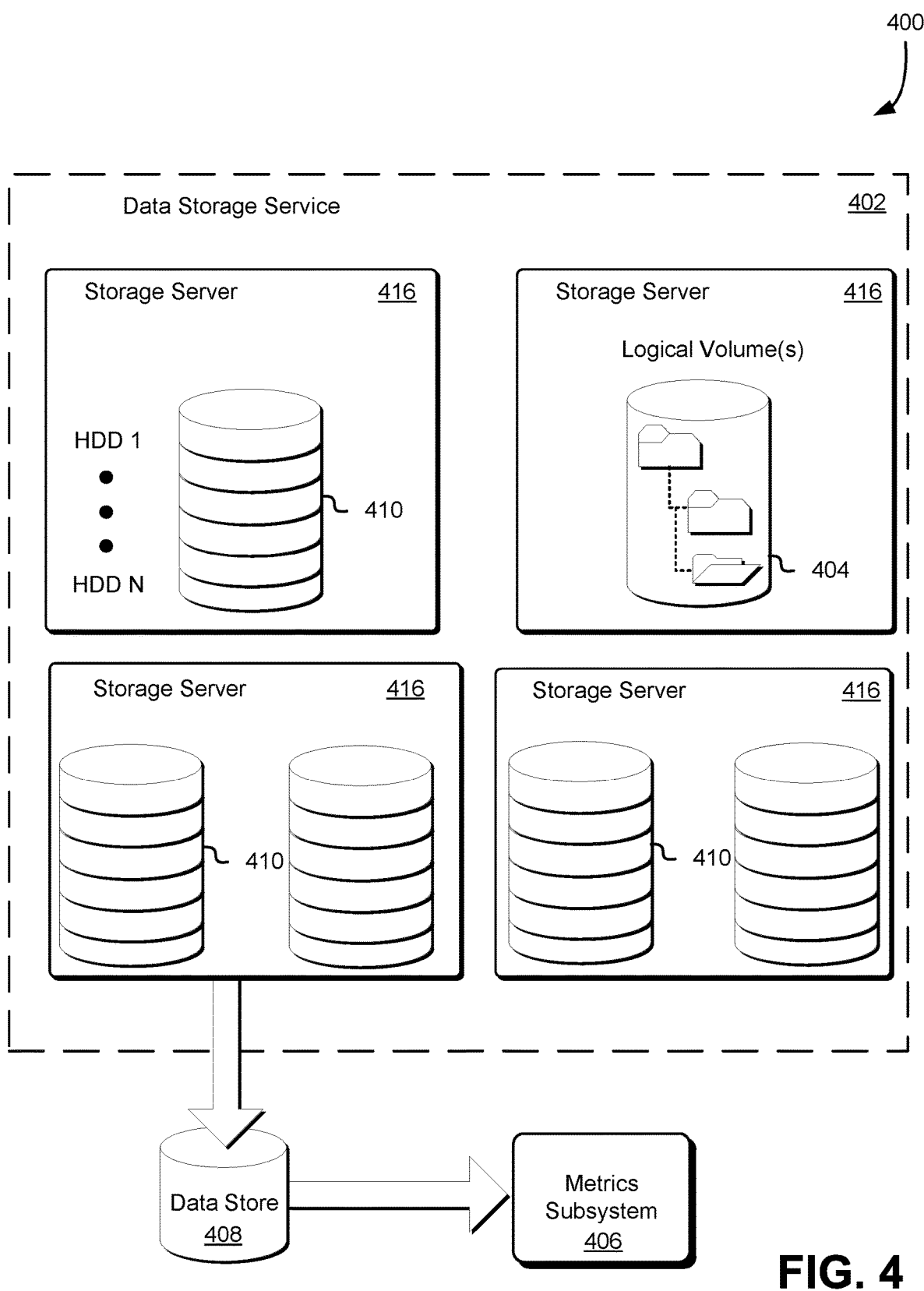
FIG. 4 illustrates an example of storage nodes of a data storage service in accordance with an embodiment.

FIG. 4 illustrates an example system 400 where one or more computer systems, as well as the executable code running thereon, may provide customers with logical storage volumes 404 wherein the logical storage volume may be maintained by a data storage service 402 using data storage servers 416. The data storage service 402, in various embodiments, is one service of a set of services provided to customers by a computing resource service provider. As described in greater detail above, the data storage service 402 provides customers with logical storage volumes 404 using computing resources of one or more data storage servers 416 such as a server computer system. The customer may use these logical data storage volumes to store blocks of data. Furthermore, in some examples, the data storage service comprises a plurality of server computer systems including storage devices (e.g., hard disk drives) that provide the logical data storage volumes to the customers. These server computer systems may execute various software applications to provide the logical data storage volumes to the customers.

Customer data may be stored across a variety of different data storage servers 416 containing one or more storage devices such as block-level storage devices, illustrated in FIG. 4 as hard disk drives (HDDs) 1 through N. The customer data stored on the different devices may be exposed to a computer system operated by the customer and include a logical storage volume 404. Described in greater detail above, the customer may instantiate one or more virtual machines on computing resources of the data storage service 402, and then one or more virtual machines may attach the exposed logical storage volumes 404 to enable the customer to interact with the data stored in the logical storage volumes 404 maintained by the remote storage service using one or more data storage servers 416. The logical storage volumes 404 may contain one or more files which are simultaneously accessible to multiple computer systems operated by customers of the data storage service 402. Furthermore, as illustrated in FIG. 4, a metrics subsystem 406, as described above, may determine utilization information associated with the data storage servers 416.

As illustrated by FIG. 4 the data storage server 416 may include a pool or other collection of storage devices 1 through N configured to store data on behalf of customers of the data storage service 402 or other entities. The hardware configuration of the data storage server 416 may include computing resources 410 such as network interfaces, rack, switches, HDDs, solid-state drives or other storage devices, processors, memory, or any other physical component of the data storage server 416. The software configuration of the data storage server 416 may include logical storage volume placement algorithms, operating systems, hypervisors, throttling applications, or other applications managing customer access to computing resources of the data storage server 416, and any other application loaded into memory of the data storage server 416. The data storage server 416 may be accessible by an IP address or other network information. An example of a storage node is a network (e.g., Ethernet) attached storage (NAS) device, a storage area network (SAN) storage device, or a NAS-SAN hybrid storage device. NAS protocols include network file system (NFS), server message block/common internet file system (SMB/CIFS), and Apple filing protocol (AFP). SAN protocols include Fibre Channel, iSCSI, AT Attachment over Ethernet (AoE), and HyperSCSI.

As described above, a metrics subsystem 406 may obtain metadata and other information associated with the snapshots maintained by the data storage server 416 or components thereof such as the computing resources 410. In one example the metrics subsystem 406 obtains the snapshot metadata and manifest from a data store 408. The information included in the data store 408 may be used to determine utilization based at least in part on metadata and/or manifest information obtained by the metrics subsystem 406. The data store 408 may include physical storage devices, virtual storage devices, a storage location provided by a data storage service, or other location suitable for storing metadata, manifest, and other information associated with snapshots of the logical storage volumes 404. In various embodiments, the metrics subsystem 406 obtains manifest information from the data storage servers 416 and determines utilization of the computing resources 410 as described in greater detail below in connection with FIG. 7. Although a data storage server 416 is illustrated in FIG. 4, various different types of server computer systems may be used in connection with the techniques described in the present disclosure.

Figure 5:
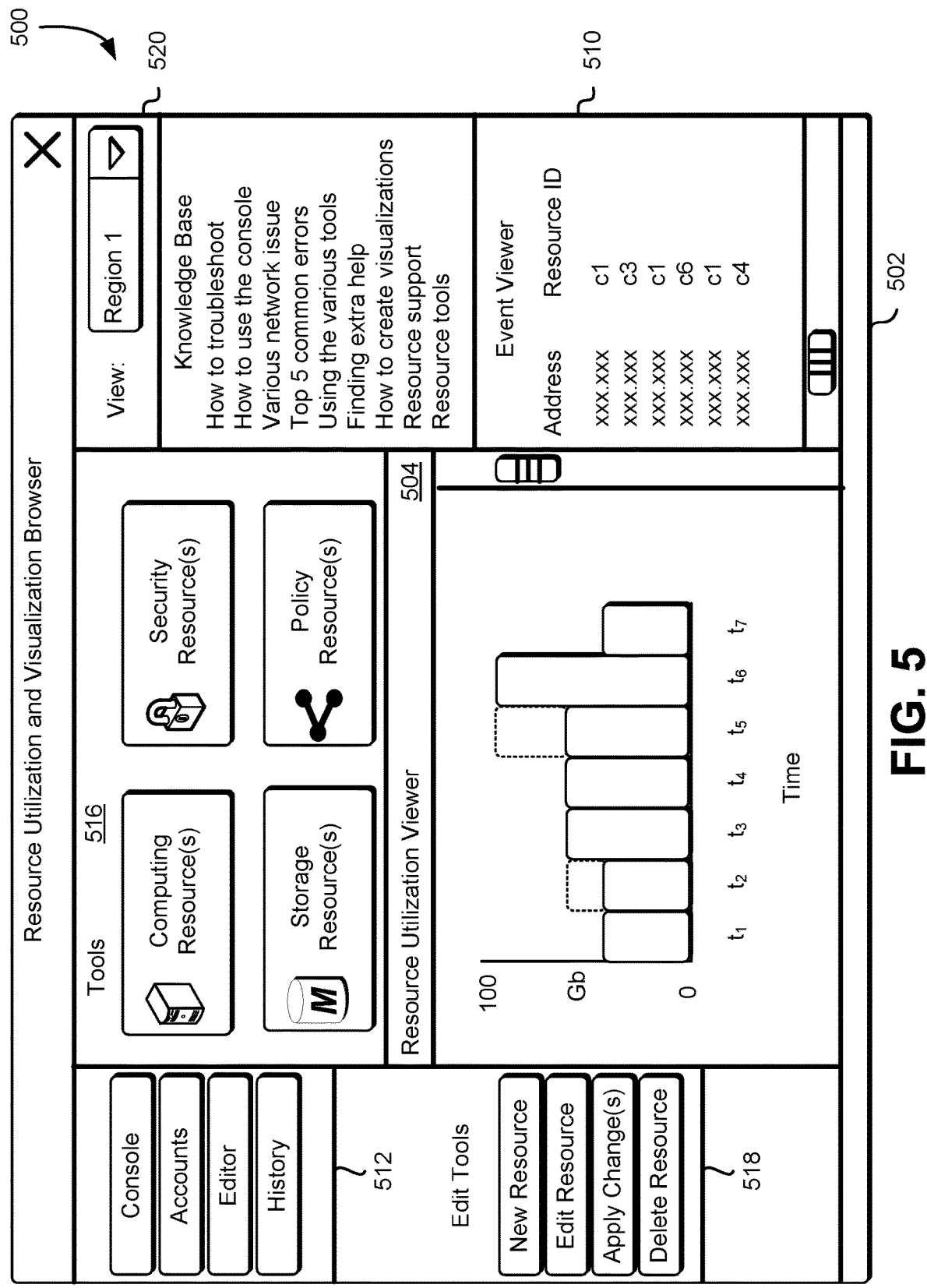
FIG. 5 illustrates an environment in which a management console is presented to a user as a graphical user interface displayed by a computing device in accordance with an embodiment.

FIG. 5 illustrates an example system 500 where a resource utilization and visualization browser 502 may be used to provide customers with information associated with computing resource utilization and/or consumption associated with customer-operated computing resources based at least in part on metadata obtained from server computer systems as described in the present disclosure at least as described above in connection with FIGS. 1-4 and in accordance with at least one embodiment. As described above, in various embodiments, the resource utilization and visualization browser 502 is executed by a computer system and is provided as a user interface to a set of services such as a web service, data storage service, virtual computer systems service, or other services as described in the present disclosure.

As illustrated in FIG. 5, the resource utilization and visualization browser 502 is provided as a user interface executed by an application, such as a web browser executing on a computer system operated by the customer, as well as other user interfaces that may be used to present utilization information as described above. Furthermore, as illustrated in FIG. 5, the customer is presented with utilization information generated by a metrics subsystem in a display pane 504 labeled as the "Resource Utilization Viewer." The display pane 504 may include any of the utilization information as described above. In the specific example illustrated in FIG. 5, the display pane 504 includes results of the metrics subsystem determining attribution of underlying physical resources to snapshots of a logical storage volume over an interval of time as described above.

In an example, the display pane 504 includes a bar graph displaying monotonically increasing disk utilization of a particular customer over an interval of time corresponding to the creation of snapshots of a logical storage volume as described above. Furthermore, the display pane 504 may include an indication of data unique to the snapshots and a point in time the snapshot was created. In the example illustrated in FIG. 5, the snapshots at time $t_2$ and $t_5$ contain a portion of the bar graph that has dashed lines to indicate unique data. As described in the present disclosure, the metrics subsystem may obtain metadata associated with logical volumes and parse the metadata to determine what blocks of data of a particular snapshot references other snapshots and what block of data reference storage locations associated with the particular snapshot. If the reference for a particular block of data references a storage location of the snapshot the data may be considered unique (e.g., not shared with at least one previous snapshot).

The resource utilization and visualization browser 502 includes tools 516 that aid the customer in performing various operations as described in greater detail above. In an example, the tools 516 aid the customer to make modifications to the customer's computing resource environment to reduce an amount of computing resources consumed by the customer (e.g., deleting snapshots with unique data). As illustrated in FIG. 5, the resource utilization and visualization browser 502 further includes a set of options 512 used to perform various functions in connection with the resource utilization and visualization browser 502. The set of options 512 may be a set of functions included in the resource utilization and visualization browser 502 that enables a customer to perform a variety of operations as described in greater detail above in connection with FIGS. 1-4. The options 512 may be configured as graphical user interface elements of the resource utilization and visualization browser 502.

The customer may use editing tools 518 to edit, create, or modify existing computing resources as described above. An operation enabled by the resource utilization and visualization browser 502 includes a view of different regions from a drop-down menu 520. The different regions may include different geographical regions or different logical regions within the same or different geographical regions. For example, different regions may include two or more separate virtual networks. Customers may navigate to a particular group using a graphical user interface element as illustrated in FIG. 5. Selection of a particular region may limit the information and generate views of information specific to the region.

In various embodiments, the editing tools 518 provide, through the resource utilization and visualization browser 502, the customers with resources to aid in determining the utilization of various different computing resources and modifying resources. In the example, the editing tools 518 allow customers to create, delete, and modify customer resources. The resource utilization and visualization browser 502 may further include an event viewer 510. The event viewer 510, in various embodiments, provides the customer with information regarding events that may modify the customer's utilization and/or may trigger the metrics subsystem to determine utilization. In one example, the event viewer 510 includes a set of snapshots that have been created and are associated with one or more logical storage volumes. The event viewer 510 may enable the customer to view computing resources that may be contributing to the customer's utilization of computing resources.

Figure 6:
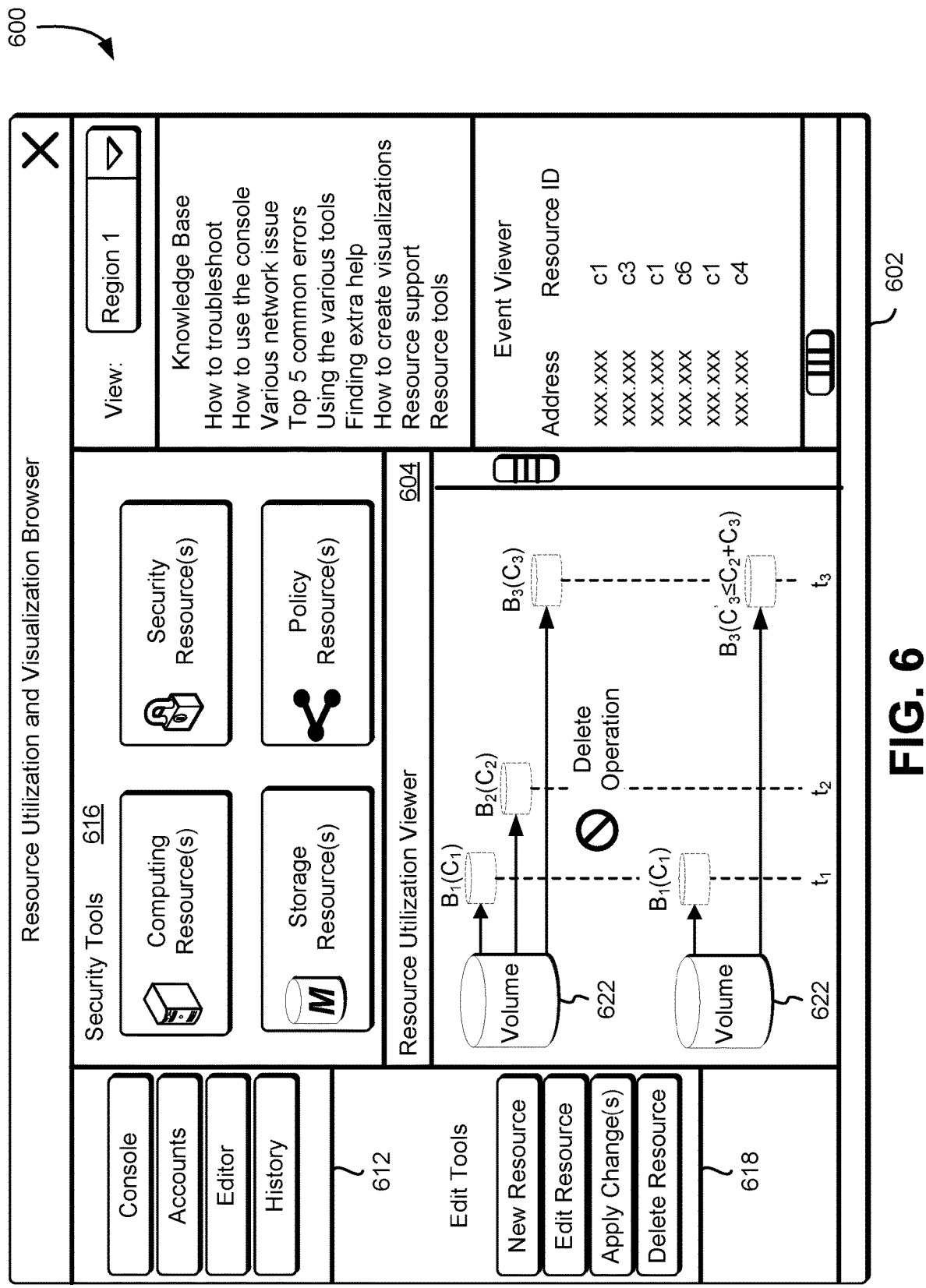
FIG. 6 illustrates an environment in which a management console is presented to a user as a graphical user interface displayed by a computing device in accordance with an embodiment.

FIG. 6 illustrates an example system 600 where a resource utilization and visualization browser 602 may be used to provide customers with information associated with computing resource utilization and/or consumption associated with customer operated computing resources based at least in part on metadata obtained from server computer systems as described in the present disclosure at least as described above in connection with FIGS. 1-4 and in accordance with at least one embodiment. As described above, in various embodiments, the resource utilization and visualization browser 602 is executed by a computer system and is provided as a user interface to a set of services such as a web service, threat analysis service, or other services as described in the present disclosure.

As illustrated in FIG. 6, the resource utilization and visualization browser 602 is provided as a user interface executed by an application, such as a web browser executing on a computer system operated by the customer as well as other user interfaces that may be used to present computing resources utilization information as described above. Furthermore, as illustrated in FIG. 6 and as described in greater detail above, the customer is presented with utilization information generated by a metrics subsystem in a display pane 604 labeled as the "Resource Utilization Viewer." In the specific example illustrated in FIG. 6, the display pane 604 includes results of the metrics subsystem determining the utilization of computing resources by a customer as described above.

In the example illustrated in FIG. 6, the display pane 604 includes a display of snapshots of a logical storage volume 622 over an interval of time before a delete operation and after a delete operation. This information may enable the customer to visualize an amount of computing resources that may be made available if a delete operation was performed. Furthermore, the display pane 604 may include a visualization of the set of references associated with each snapshot. Specifically as illustrated in FIG. 6, the snapshot $B_1$, $B_2$, and $B_3$ contain references $C_1$, $C_2$, and $C_3$ respectively. In addition, after the delete operation snapshot $B_3$ contains the set of references $C_2$ plus $C_3$. The inheritance of references by $B_3$ can be described by the following formula: $C_3 < C_2 + C_3$. The resource utilization and visualization browser 602 includes tools 616, options 612, and editing tools 618 as described in greater detail above.

Figure 7:
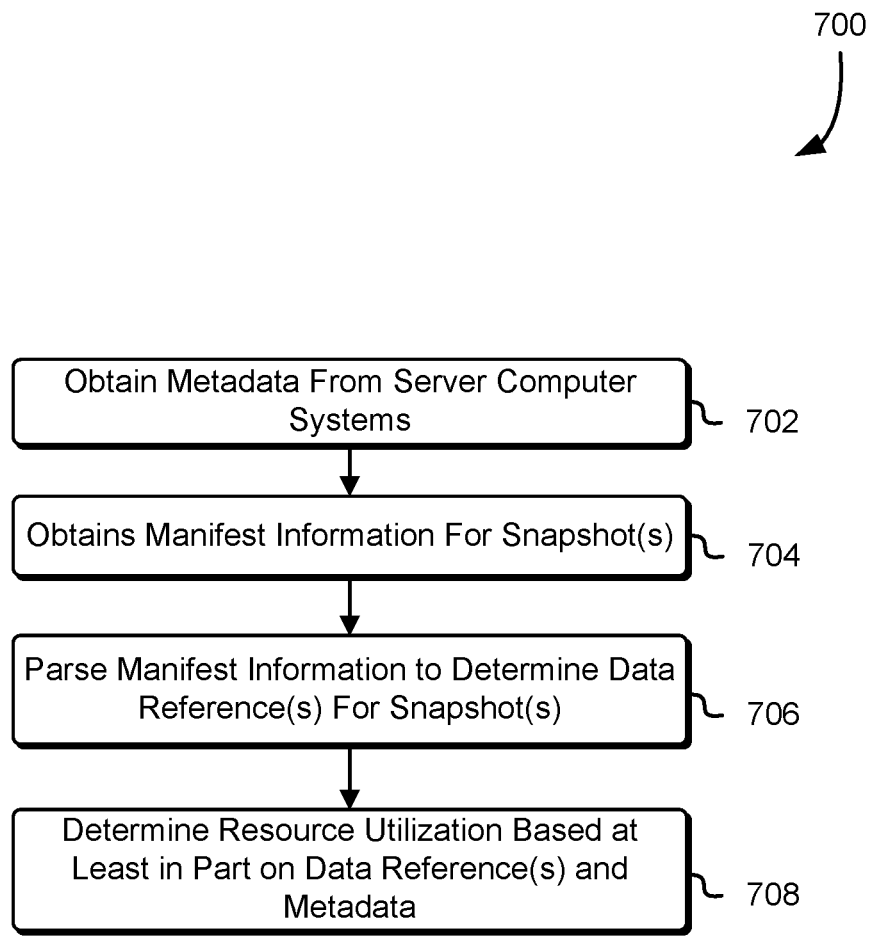
FIG. 7 shows an illustrative process which may be used to determine computing resource utilization associated with a logical storage volume in accordance with an embodiment.

FIG. 7 is a block diagram illustrating an example of a process 700 for determining the utilization of a set of server computer systems in accordance with at least one embodiment. Some or all of the process 700 (or any other processes described, or variations and/or combinations of those processes) may be performed under the control of one or more computer systems, including executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of the process 700 may be performed by any suitable system, such as a server in a data center, by various components of the system 100 described in conjunction with FIG. 1, such as the metrics subsystem, by multiple computing devices in a distributed system of a computing resource service provider or by a service provided by a computing resource service provider. The process 700 includes a set of operations that can be used to determine utilization of computing resources (e.g., storage devices) of a set of server computer systems. For example, the process 700 includes obtaining metadata from the set of server computer systems 702. As described above in connection with FIG. 3, the metrics subsystem may obtain metadata from the set computer systems. In yet other embodiments, a stream service or an on-demand data storage service obtains the metadata and provides the metadata to the metrics subsystem. In one example, the server computer systems maintain the metadata in a storage location accessible to the metrics subsystem.

In step 704 the metrics subsystem obtains manifest information for snapshots of logical storage volumes from the metadata. As described above, the manifest information may indicate the location of data such as references to other snapshots and/or references to storage locations within physical storage devices. In various embodiments, the manifest is included in the metadata associated with the snapshot and/or logical storage volume.

In step 706 the metrics subsystem parses the manifest information to determine data references for a set of snapshots associated with the logical storage volumes. As described above, the metadata includes information associated with a set of logical storage volumes and/or snapshots of the set of logical storage volumes maintained by the set of server computer systems (e.g., manifest information, creation time information, ownership information, etc.). The metrics subsystem may parse the manifest information to determine data references associated with a particular block of data and/or data object. In one example, a manifest for a particular snapshot may include a reference to a previous snapshot where a first block of data of the snapshot is located and a reference to a storage device where a second block of data is located. The metrics subsystem, in various embodiments, parses the manifest information for a plurality of snapshots and aggregates all of the references to a particular block of data. In this manner, the metrics subsystem can trace and/or map data references between snapshots and based at least in part on a timestamp associated with the snapshots determine utilization of the computing resources among the snapshots.

In step 708 the metrics subsystem determines resource utilization based at least in part on the data references and the metadata. As described above, data references associated with the same block of data, data object, or other identifier or data may be aggregated across snapshots and/or logical storage volumes. These aggregated references may include a single reference to a physical storage location and a plurality of references to other snapshots. Returning to the example above, snapshot $B_3$ may include references $C_3$ which may indicate snapshot $B_2$ which may include references $C_2$ which may indicate snapshot $B_1$ which may include references $C_1$ which may indicate a physical storage location of a storage device. The metrics subsystem, in various embodiments, then assigns the utilization of computing resources associated with the aggregated set of references (e.g., the block of data referenced) to a single computing resource (e.g., snapshot or logical storage volume), for example, the computing resource with the earliest time stamp. Note that one or more of the operations performed in 702-708 may be performed in various orders and combinations, including in parallel. In numerous variations to the process 700, one or more of the operations 702-708 may be omitted or performed by other systems of services.

Figure 8:
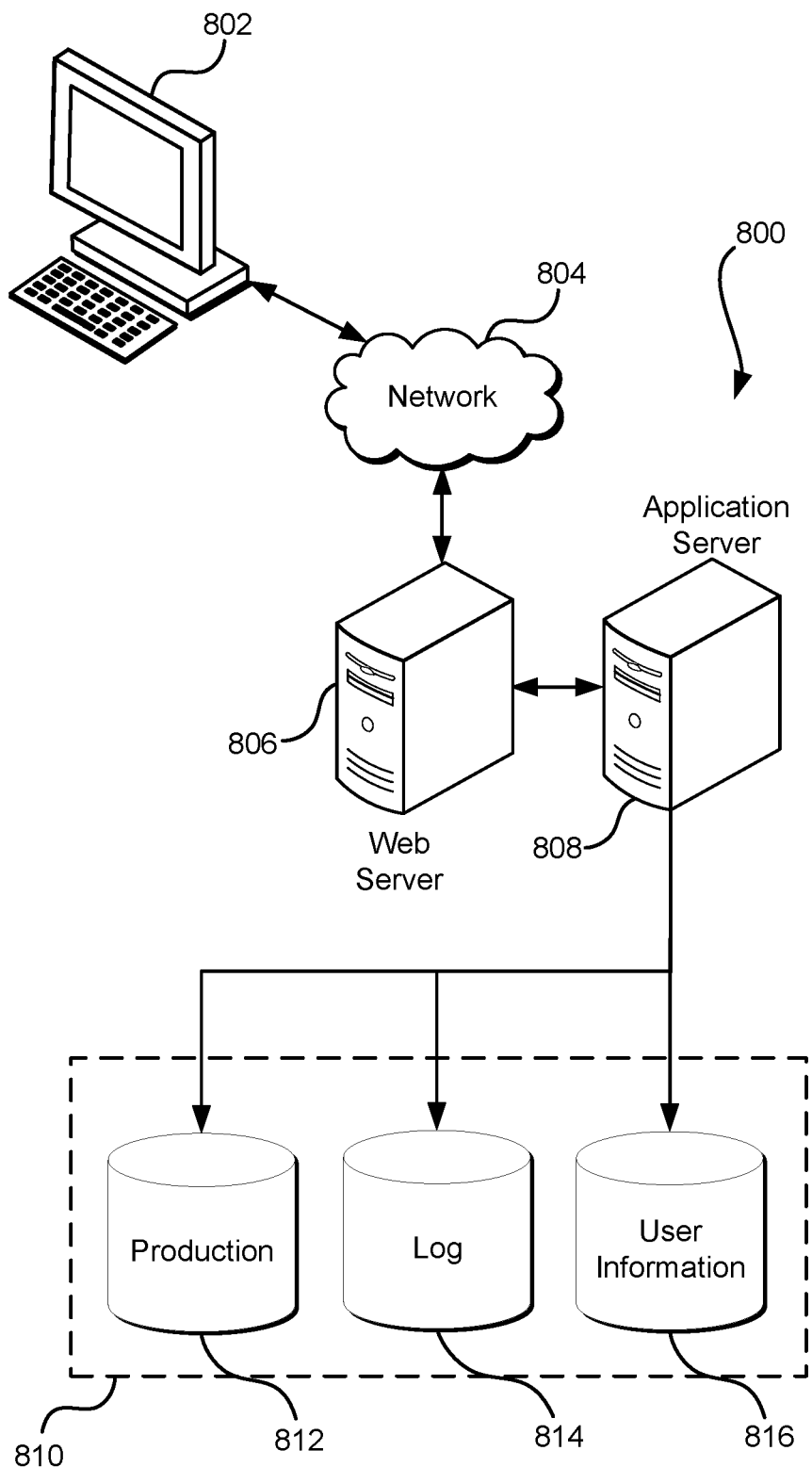
FIG. 8 illustrates an environment in which various embodiments can be implemented.

FIG. 8 illustrates aspects of an example environment 800 for implementing aspects in accordance with various embodiments. As will be appreciated, although a web-based environment is used for purposes of explanation, different environments may be used, as appropriate, to implement various embodiments. The environment includes an electronic client device 802, which can include any appropriate device operable to send and/or receive requests, messages, or information over an appropriate network 804 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network, and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly addressable communications network, as the environment includes a web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually and/or through other senses. The handling of all requests and responses, as well as the delivery of content between the client device 802 and the application server 808, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 810 can include several separate data tables, databases, data documents, dynamic data storage schemes, and/or other data storage mechanisms and media for storing data relating to a particular aspect of the present disclosure. For example, the data store illustrated may include mechanisms for storing production data 812 and user information 816, which can be used to serve content for the production side. The data store also is shown to include a mechanism for storing log data 814, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. The application server 808 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices, or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware, or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
obtaining metadata associated with a plurality of snapshots of logical storage volumes provided by a data storage service;
obtaining a plurality of manifests associated with the plurality of snapshots including references to storage locations of data associated with the plurality of snapshots;
aggregating a plurality of references to a block of data by at least parsing a portion of the plurality of manifests to determine the plurality of references to the block of data associated with two or more snapshots of the plurality of snapshots;
determining utilization of computing resources associated with the block of data by at least assigning the utilization of the computing resources to a snapshot of the two or more snapshots, the snapshot containing a reference of the plurality of references and where the metadata indicates that the snapshot was created prior to at least one other snapshot of the two or more snapshots; and
providing the utilization to a metering service.

2. The computer-implemented method of claim 1, wherein determining the utilization of computing resources is performed by a server computer system implementing the computing resources.

3. The computer-implemented method of claim 1, wherein providing the utilization further comprises causing the metering service to generate information to provide to a customer associated with at least one snapshot of the plurality of snapshots.

4. The computer-implemented method of claim 1, wherein the computer-implemented method further comprises:
obtaining an indication that a snapshot of the plurality of snapshots has been deleted; and
determining the utilization of computing resources as a result of obtaining the indication.

5. A system, comprising:
one or more processors; and
memory that stores computer-executable instructions that, if executed by the one or more processors, cause the system to:
obtain metadata associated with a plurality of snapshots of a volume provided by a data storage service;
determine a set of references to data of the volume included in the metadata, at least a portion of references of the set of references indicating locations of blocks of data of the volume;
determine utilization of computing resources associated with the volume by at least assigning the utilization to a particular snapshot of the plurality of snapshots of the volume based at least in part on the set of references; and
provide the utilization to a metering service.

6. The system of claim 5, wherein the instructions that cause the system to provide the utilization to the metering service further include instructions that, if executed by the one or more processors, cause the system to cause the metering service to generate a visualization of the utilization.

7. The system of claim 5, wherein the instructions that cause the system to provide the utilization to the metering service further include instructions that, if executed by the one or more processors, cause the system to cause the metering service to provide, to a customer associated with the volume, information indicating unique data associated with at least one snapshot of the plurality of snapshots.

8. The system of claim 7, wherein the instructions further comprises instructions that, if executed by the one or more processors, cause the system to cause the unique data to be transferred to long term storage in response to a request from the customer.

9. The system of claim 8, wherein the instructions further comprises instructions that, if executed by the one or more processors, cause the system to provide the customer with information indicating an amount of computing resources made available as a result of deleting the unique data.

10. The system of claim 5, wherein the instructions further comprises instructions that, if executed by the one or more processors, cause the system to obtain a request from a customer associated with the volume to determine the utilization.

11. The system of claim 5, wherein the instructions that cause the system to provide the utilization to the metering service further include instructions that, if executed by the one or more processors, cause the system to cause the metering service to provide information indicating an amount of storage space consumed by the plurality of snapshots.

12. The system of claim 5, wherein the instructions that cause the system to provide the utilization to the metering service further include instructions that, if executed by the one or more processors, cause the system to cause the metering service to provide information indicating an amount of data referenced by a particular snapshot of the plurality of snapshots that is not referenced by another snapshot of the plurality of snapshots.

13. A non-transitory computer-readable storage medium having stored thereon executable instructions that, as a result of being executed by one or more processors of a computer system, cause the computer system to at least:
obtain metadata associated with a plurality of snapshots of a volume;
determine an amount of computing resources consumed by the plurality of snapshots by at least aggregating a set of references to generate an aggregated set of references, the set of references included in the metadata associated with the plurality of snapshots where the references indicate locations of data included in the plurality of snapshots;
assign utilization of the amount of computing resources to a snapshot of the plurality of snapshots based at least in part on the aggregated set of references and the metadata; and
provide the utilization to a metering service.

14. The non-transitory computer-readable storage medium of claim 13, wherein the set of references are included in a set of manifests associated with the plurality of snapshots.

15. The non-transitory computer-readable storage medium of claim 13, wherein the instructions that cause the computer system to assign the utilization of the amount of computing resources to the snapshot further comprise instructions that, as a result of being executed by the one or more processors, cause the computer system to assign the utilization as a result of receiving a request for the utilization from a customer associated with the volume.

16. The non-transitory computer-readable storage medium of claim 13, wherein the instructions that cause the computer system to determine the amount of computing resources consumed by the plurality of snapshots further include instructions that cause the computer system to determine the amount of computing resources consumed by the plurality of snapshots as a result of an expiration of an interval of time.

17. The non-transitory computer-readable storage medium of claim 13, wherein the instructions that cause the computer system to determine the amount of computing resources consumed by the plurality of snapshots further include instructions that cause the computer system to determine the amount of computing resources consumed by the plurality of snapshots as a result of a trigger detected by the computer system, where the trigger is indicated by a customer associated with the volume.

18. The non-transitory computer-readable storage medium of claim 17, wherein the trigger further comprises an indication of an operation to encrypt a snapshot of the plurality of snapshots.

19. The non-transitory computer-readable storage medium of claim 17, wherein the trigger further comprises an indication that a snapshot of the plurality of snapshots has been deleted.

20. The non-transitory computer-readable storage medium of claim 17, wherein the trigger further comprises an indication that a snapshot of the plurality of snapshots has been created.

* * * * *